United States Patent [19]
Imanishi et al.

[11] Patent Number: 5,742,751
[45] Date of Patent: Apr. 21, 1998

[54] CURVE APPROXIMATION METHOD

[75] Inventors: Aisaku Imanishi; Shingo Takahashi, both of Tokyo, Japan

[73] Assignee: Seiko Precision Inc., Tokyo, Japan

[21] Appl. No.: 538,818

[22] Filed: Oct. 31, 1995

Related U.S. Application Data

[63] Continuation of Ser. No. 355,416, Dec. 13, 1994, abandoned, which is a continuation of Ser. No. 935,083, Aug. 24, 1992, abandoned.

[30] Foreign Application Priority Data

Sep. 4, 1991 [JP] Japan .................. 3-223835
Sep. 4, 1991 [JP] Japan .................. 3-223836

[51] Int. Cl.$^6$ ............................... G06F 15/00
[52] U.S. Cl. ........................................ 395/142
[58] Field of Search ...................... 395/141, 142; 345/133, 134

[56] References Cited

U.S. PATENT DOCUMENTS

| | | | |
|---|---|---|---|
| 4,943,935 | 7/1990 | Sato | 364/518 |
| 4,951,230 | 8/1990 | Dalrymple et al. | 364/521 |

FOREIGN PATENT DOCUMENTS

| | | |
|---|---|---|
| 0481463A2 | 4/1992 | European Pat. Off. . |
| 0481463A3 | 4/1992 | European Pat. Off. . |
| 6482282 | 3/1989 | Japan . |
| 2168361 | 6/1990 | Japan . |
| 2224914 | 5/1990 | United Kingdom . |

OTHER PUBLICATIONS

Gassan, "Geometry of Spatial Forms", 1983, pp. 473–485.

Kahaner et al. "Numerical Methods and Software", 1989, pp. 81–137.

*Primary Examiner*—Phu K. Nguyen
*Attorney, Agent, or Firm*—Jordan and Hamburg

[57] ABSTRACT

A method for expressing an approximate curve of an original curve by approximately expressing the original curve such as Bezier curve using matrix dots, comprises finding first and second coordinates of three consecutive dots of the approximate curve; and then finding a third coordinate of the three consecutive dots of the approximate curve on the basis of a difference between value of parameter "t" used for determining the coordinates of the first dot and that used for determining the coordinates of the second dot.

6 Claims, 9 Drawing Sheets

FIG. 1

| Q | n | t | x | y | Δn |
|---|---|---|---|---|---|
|  | 64 | 64/128 | 25 | 17 |  |
|  | 32 | 32/128 | 11 | 12 |  |
|  | 16 | 16/128 | 5 | 7 |  |
|  | 8 | 8/128 | 2 | 4 |  |
|  | 4 | 4/128 | 1 | 2 |  |
| Q1 | 2 | 2/128 | 0 | 1 | 2 |
| Q2 | 4 | 4/128 | 1 | 2 | 2 |
| Q3 | 6 | 6/128 | 2 | 3 | 2 |
| Q4 | 8 | 8/128 | 2 | 4 | 2 |
| Q5 | 10 | 10/128 | 3 | 4 | 2 |
| ⋮ | ⋮ | ⋮ | ⋮ | ⋮ | ⋮ |
| Q13 | 26 | 26/128 | 8 | 10 | 2 |
| Q14 | 28 | 28/128 | 9 | 11 | 2 |
| Q15 | 30 | 30/128 | 10 | 11 | 2 |
| Q16 | 32 | 32/128 | 11 | 12 | 2 |
|  | 34 | 34/128 | 11 | 12 |  |
| Q17 | 35 | 35/128 | 12 | 13 | 3 |
| Q18 | 38 | 38/128 | 13 | 13 | 3 |
| Q19 | 41 | 41/128 | 14 | 14 | 3 |
|  | 44 | 44/128 | 16 | 15 |  |
| Q20 | 43 | 43/128 | 15 | 15 | 2 |
| Q21 | 45 | 45/128 | 16 | 15 | 2 |
| Q22 | 47 | 47/128 | 17 | 15 | 2 |
| Q23 | 49 | 49/128 | 18 | 16 | 2 |
| ⋮ | ⋮ | ⋮ | ⋮ | ⋮ | ⋮ |

FIG. 5

| n | t | WA | WB | WC | WD |
|---|---|---|---|---|---|
| 0 | 0/128 | WA0 | WB0 | WC0 | WD0 |
| 1 | 1/128 | WA1 | WB1 | WC1 | WD1 |
| 2 | 2/128 | WA2 | WB2 | WC2 | WD2 |
| . | . | . | . | . | . |
| . | . | . | . | . | . |
| . | . | . | . | . | . |
| . | . | . | . | . | . |
| 127 | 127/128 | WA127 | WB127 | WC127 | WD127 |
| 128 | 128/128 | WA128 | WB128 | WC128 | WD128 |

FIG.6

| Address | Data |
|---|---|
| 0 0 0 | W A 0 |
| 0 0 1 | W A 1 |
| . | . |
| . | . |
| 1 2 8 | W A 1 2 8 |
| 1 2 9 | W B 0 |
| 1 3 0 | W B 1 |
| . | . |
| . | . |
| 2 5 7 | W B 1 2 8 |
| 2 5 8 | W C 0 |
| 2 5 9 | W C 1 |
| . | . |
| . | . |
| 3 8 6 | W C 1 2 8 |
| 3 8 7 | W D 0 |
| 3 8 8 | W D 1 |
| . | . |
| . | . |
| 5 1 5 | W D 1 2 8 |

FIG. 7

| Address | Data |
|---------|------|
| 0 0 0 0 | P A x |
| 0 0 0 1 | P B x |
| 0 0 0 2 | P C x |
| 0 0 0 3 | P D x |
| 0 0 0 4 | P A y |
| 0 0 0 5 | P B y |
| 0 0 0 6 | P C y |
| 0 0 0 7 | P D y |

FIG. 8

| Address | Data |
|---------|------|
| 0 0 0 0 | x = 0 |
| 0 0 0 1 | y = 0 |
| 0 0 0 2 | x = 0 |
| 0 0 0 3 | y = 1 |
| 0 0 0 4 | x = 1 |
| 0 0 0 5 | y = 2 |
| 0 0 0 6 | x = 2 |
| 0 0 0 7 | y = 3 |
| 0 0 0 8 | x = 2 |
| 0 0 0 9 | y = 4 |
| . | . |
| . | . |
| . | . |
| 0 0 2 6 | x = 8 |
| 0 0 2 7 | y = 1 0 |
| 0 0 2 8 | x = 9 |
| 0 0 2 9 | y = 1 1 |
| 0 0 3 0 | x = 1 0 |
| 0 0 3 1 | y = 1 1 |
| . | . |
| . | . |

CURVE APPROXIMATION METHOD

This application is a continuation of application Ser. No. 08/355,416 filed Dec. 13, 1994, now abandoned which is a continuation of Ser. No. 07/935,083 filed Aug. 24, 1992, which has been abandoned.

FIELD OF THE INVENTION

The present invention relates to a method for approximating curves used for outline fonts, etc.

BACKGROUND OF THE INVENTION

Conventionally, when a curve is displayed on a display medium using matrix type dots such as CRTs and printers, the curve is divided into a plurality of short vectors and linear interpolation is performed on them by means of a DDA (Digital Differential Analyzer).

The prior art method mentioned above, however, has the problem that processing time is prolonged and approximation accuracy is worsened because the curve is divided into short vectors.

SUMMARY OF THE INVENTION

Accordingly, it is an object of the present invention to overcome the aforementioned problem by providing a curve approximation method taking a shorter processing time and having an excellent approximation accuracy.

The curve approximation method of the invention is a method for expressing an approximate curve of an original curve represented by points "Pk" (k=1, ..., m) for expressing anchor points and control points and by parameter functions "Wk" (k=1, ..., m) expressed using parameter "t" as $$Q = \sum_{k=1}^{k=m} (Wk \times Pk)$$

by approximately expressing by using matrix dots, comprising the process of finding first and second coordinates of three consecutive dots of the approximate curve and of finding a coordinate of a third coordinate of the three consecutive dots of the approximate curve on the basis of a difference between value of the parameter "t" used for determining the coordinate of the first dot and that used for determining the coordinate of the second dot.

Another curve approximation method of the invention comprises expressing an approximate curve of an original curve represented by points "Pk" (k=1, ..., m) for expressing anchor points and control points and by parameter functions "Wk" (k=1 ..., m) expressed using parameter "t" as $$Q = \sum_{k=1}^{k=m} (Wk \times Pk)$$

by approximately expressing by using matrix dots, comprising a first step for finding a coordinate of a first dot on the approximate curve by using the parameter "t", a second step for finding a coordinate on the original curve by changing the value of the parameter "t" used in the first step, a third step for finding a coordinate of a matrix dot which is nearest to the coordinate on the original curve found in the second step and a fourth step for determining the coordinate of the dot found in the third step as a dot on the approximate curve that immediately follows the first dot when an interval between the coordinate of the first dot found in the first process and the coordinate of the dot found in the third step is separated by one dot at lest in one axial direction and is not separated more than 1 dot in any axial direction.

BRIEF DESCRIPTION OF THE DRAWINGS

FIG. 1 is a table for explaining an embodiment of the present invention;

FIG. 5 is a table for explaining a part of the embodiment;

FIG. 6 is a table for explaining a part of the embodiment;

FIG. 7 is a table for explaining a part of the embodiment;

FIG. 8 is a table for explaining a part of the embodiment; and

DESCRIPTION OF THE PREFERRED EMBODIMENTS

Figure 2:
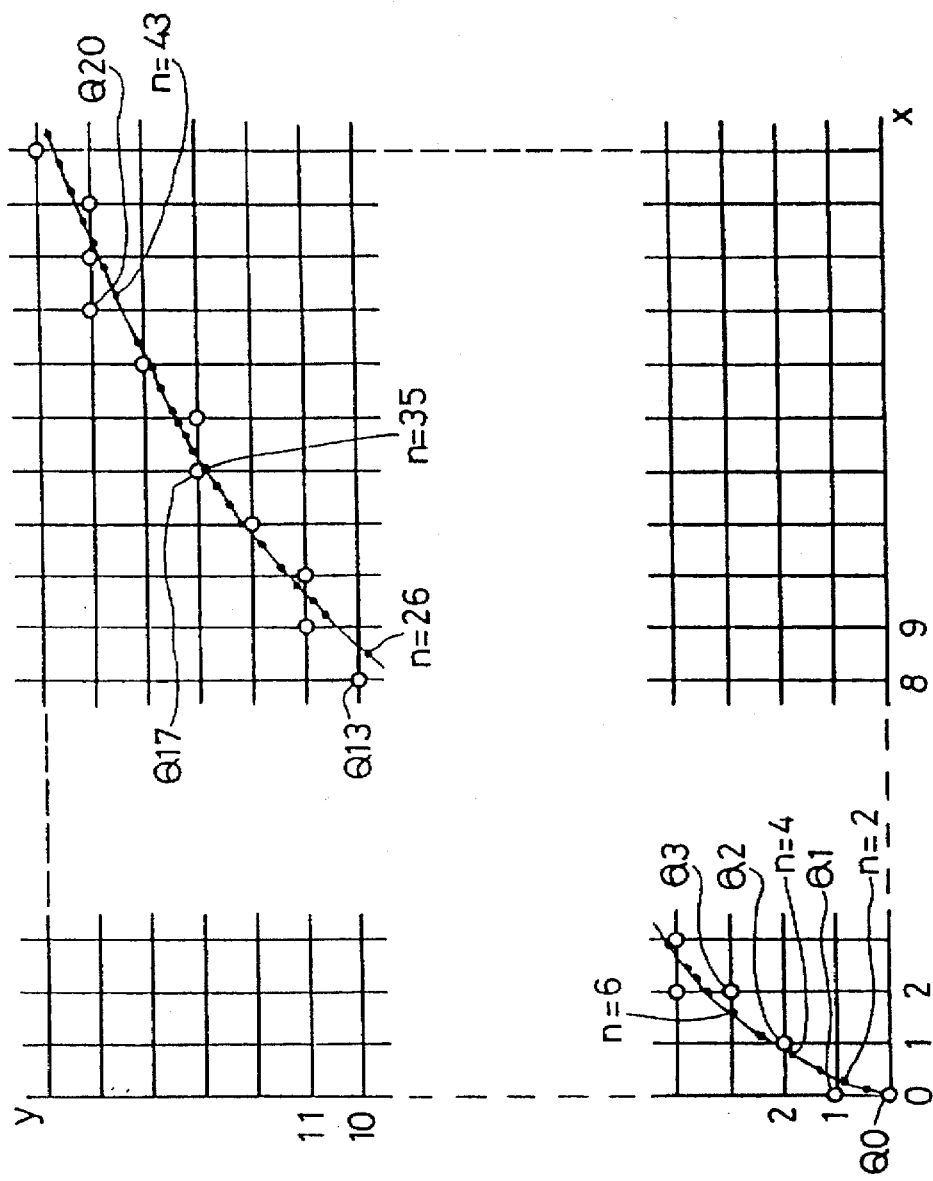
FIG. 2 is a diagram for explaining the embodiment of the invention.

Since cubic curves such as cubic Bezier curves and cubic spline curves are often used for expressing outline fonts, the following explanation will be made exemplifying such cubic curves.

Such cubic curves may be expressed parametrically as follows:

$$Q = WA \times PA + WB \times PB + WC \times PC + WD \times PD \quad (1)$$

where, WA, WB, WC and WD are functions expressed by using parameter "t" and are expressed in the case of Bezier curves, for example, as follows:

$$WA = (1-t)^3 \quad (2a)$$

$$WB = 3t*(1-t)^2 \quad (2b)$$

$$WC = 3t^2*(1-t) \quad (2c)$$

$$WD = t^3 \quad (2d)$$

$$(0 \leq t \leq 1) \quad (2e)$$

PA, PB, PC and PD are coordinates on an X-Y plane for determining the shape of the curve and are expressed as follows:

PA (x, y) : Anchor point

PB (x, y) : Control point

PC (x, y) : Control point

PD (x, y) : Anchor point

Considering now the expression (1), the parameter functions WA, WB, WC and WD are univocally determined by the type of the cubic curve as shown in expressions (2a) through (2d) and PA, PB, PC and PD are predetermined in accordance to the shape of the curve. Accordingly, as for the parameter function WA, WB, WC and WD, the parameter "t" (0≤t≤1) may be finely split as shown in FIG. 5 and the values WA, WB, WC and WD may be precalculated corresponding to the value of each t and the result thereof may be stored in a data table. For PA, PB, PC and PD, their coordinates may be also prestored as data. High speed processing is then possible by prestoring each data as described above and by performing hardware computation on the basis of expression (1) using multipliers and adders.

When the original curve represented as described above is to be expressed by dots on intersections of an X-Y matrix, (although the X-Y matrix here refers to a virtual X-Y matrix before displaying on a display medium such as CRTs and printers, it may be a physical X-Y matrix in actually displaying on such display medium), since coordinates of the intersections of the X-Y matrix only take discrete values (for example, x=0, 1, 2, ..., y=0, 1, 2, ... ), an approximate curve expressed by dots cannot reproduce the original curve faithfully. Accordingly, intersections which are close to the original curve among the intersections of the X-Y matrix are sequentially selected to express the approximate curve.

Presupposing what is described above, the method for finding coordinates of the intersections of the X-Y matrix in the approximate curve will be outlined with reference to FIGS. 1, 2 and 5. Unless specifically noted, the explanation below will be given assuming that the anchor points PA and PD and the control points PB and PC take the values as shown below:

PA (x, y)=(0, 0)

PB (x, y)=(10, 20)

PC (x, y)=(40, 25)

PD (x, y)=(50, 0)

First, setting the value of t as ½, ¼, ..., values of X-Y coordinates of the original curve are sequentially found on the basis of expression (1). Then those values are rounded up to find values of the X coordinates and Y coordinates (x, y) of intersections of the X-Y matrix sequentially. When the above operations are thus repeated and the X-Y coordinates (x, y) when the following relationship is fulfilled are defined, a first dot Q1 of the approximate is obtained:

$$(\Delta x=0 \text{ and } \Delta y=1) \text{ or } (\Delta x=1 \text{ and } \Delta y=0) \text{ or } (\Delta x=1 \text{ and } \Delta y=1) \quad (3)$$

where $\Delta x$ is an increment of the X coordinate and $\Delta y$ is an increment of the Y coordinate ("x=0", "y=1" in the example of FIGS. 1 and 2). Defining the value of n at this time as an initial value of an increment $\Delta n$ of n ("$\Delta n=2$" in the example of FIGS. 1 and 2), dots Q2, Q3, ... after the second dot are found.

When the second dot Q2 is to be found, the value of the X-Y coordinates of the original curve are found at first on the basis of expression (1) setting "t=4/128" (value which is what an initial value of $\Delta n$ "2" is, added to the value of t "2/128" when the first dot Q1 was found). Those values are then rounded up to find the X-Y coordinates (x, y) of an intersection of the X-Y matrix. In the example of FIGS. 1 and 2, "x=1, y=2", i.e., "$\Delta x=1, \Delta y=1$" and the condition of expression (3) is met, so that this value is the X-Y coordinate of the second dot Q2. The value of n is thus increased by $\Delta n$ ("$\Delta n=2$" in the example of FIGS. 1 and 2) to find the X-Y coordinate (x, y) of each dot sequentially. Then, when $\Delta x$ and $\Delta y$ meet the relationship:

$$(\Delta x=0 \text{ and } \Delta y=0) \quad (4)$$

the value of n is sequentially increased by "1" until the X-Y coordinate (x, y) meets the condition of expression (3) (in the example of FIGS. 1 and 2, the 17th dot Q17 falls under the condition). The value of $\Delta n$ at that time is then set as a new $\Delta n$ (in the example of FIGS. 1 and 2, "$\Delta n=3$"). On the other hand, when $\Delta x$ and $\Delta y$ meet the relationship:

$$(\Delta x>1 \text{ of } \Delta y>1) \quad (5)$$

the value of n is sequentially decreased by "1" until the X-Y coordinate (x, y) meets the condition of expression (3) (in the example of FIGS. 1 and 2, the 20th dot Q20 falls under the condition). Then the value of $\Delta n$ at that time is set as a new $\Delta n$ (in the example of FIGS. 1 and 2, "$\Delta n=2$").

This is the outline of the method for finding the X-Y coordinates (x, y) of the intersections of the X-Y matrix. Next, a concrete embodiment of the method for finding coordinates of intersections of the X-Y matrix in an approximate curve will be explained with reference to FIGS. 1 to 8.

Figure 3:
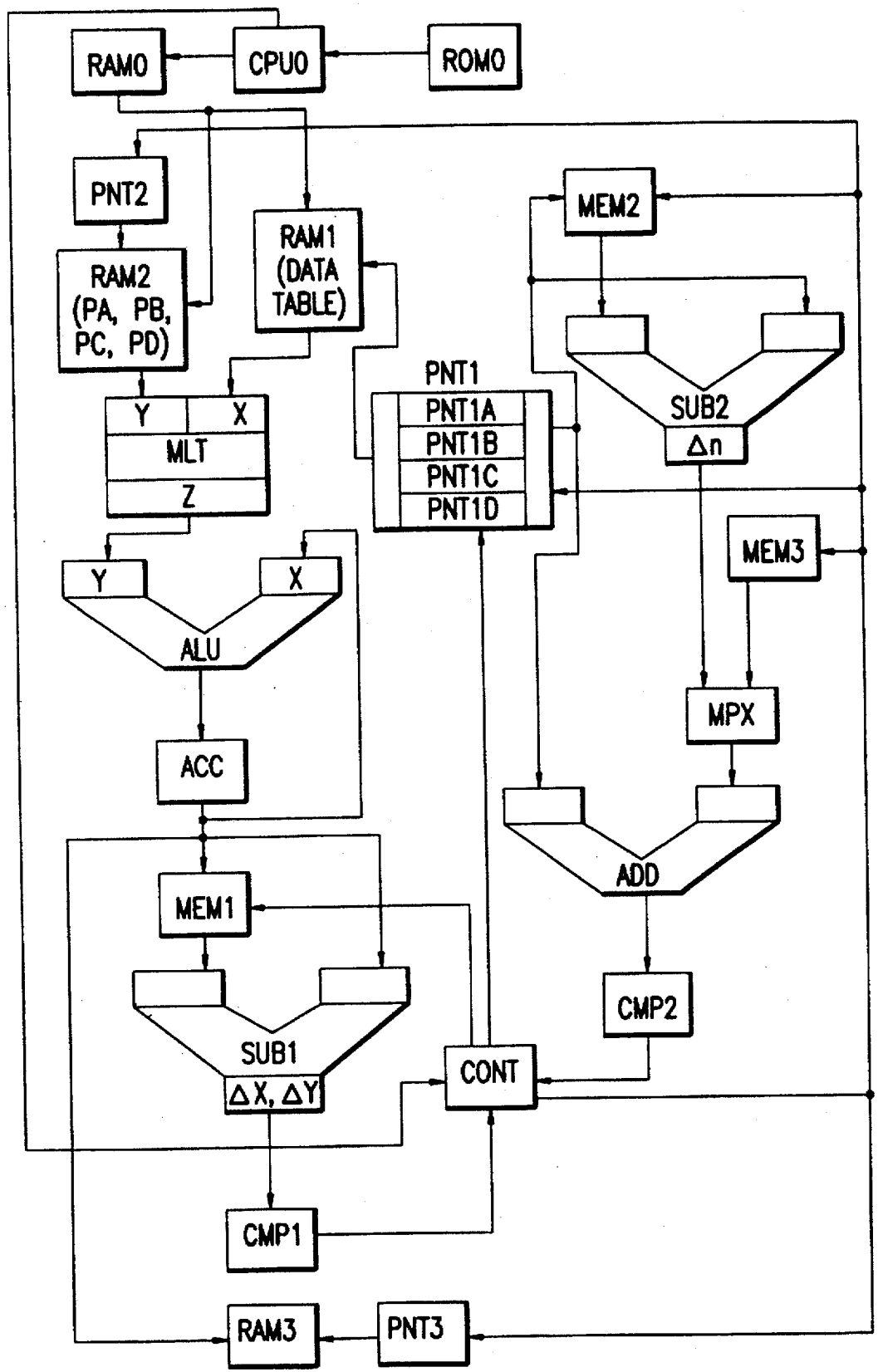
FIG. 3 is a block diagram showing the embodiment of the invention.
Figure 4:
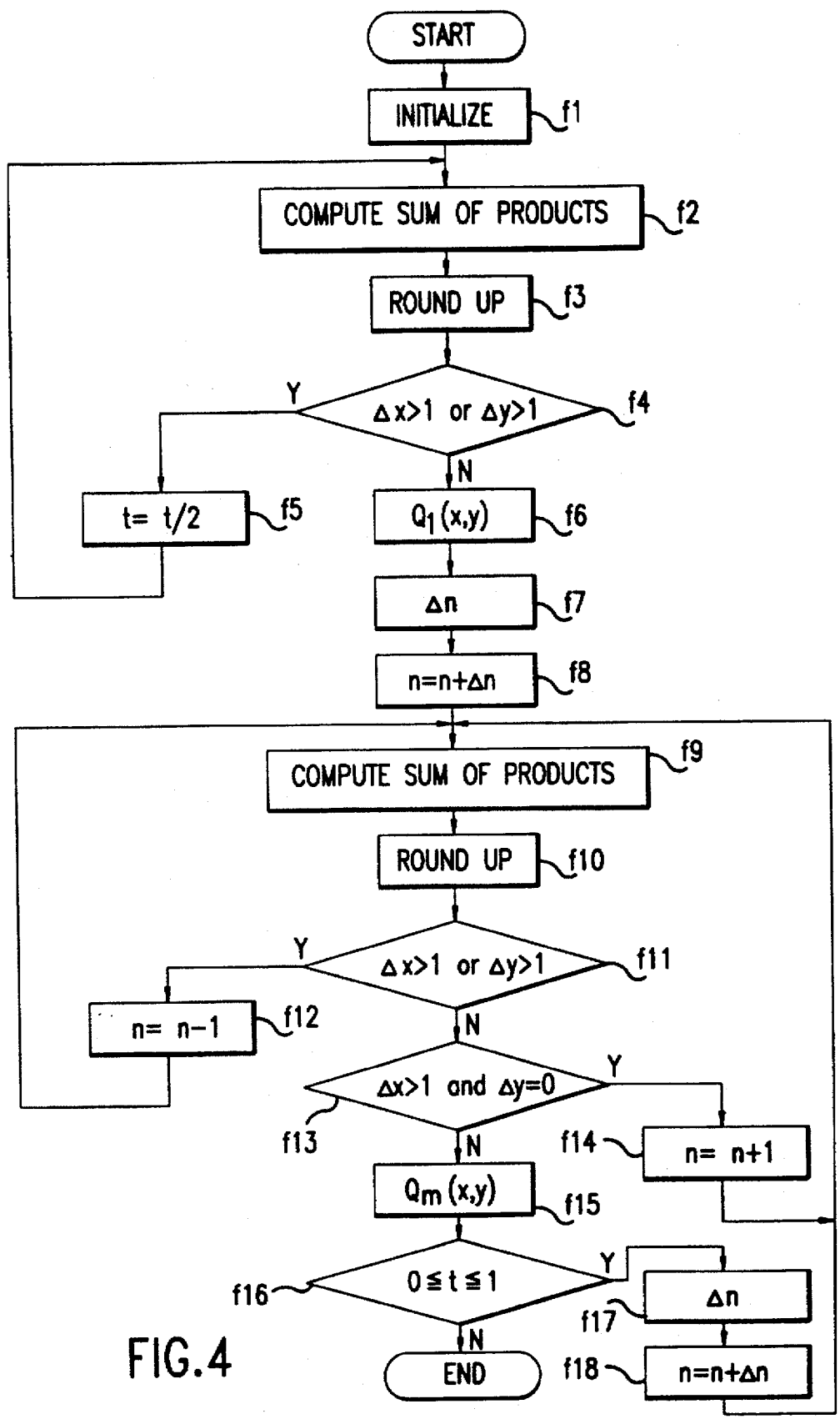
FIG. 4 is a flowchart showing the operation of the embodiment of the invention.

FIG. 3 is a block diagram illustrating a hardware arrangement of the preferred embodiment.

CPU0 is a microprocessor for controlling all of the hardware. ROM0 is a read-only memory for storing various processing programs which the microprocessor CPU0 runs. RAM0 is a random access memory for storing data concerning cubic Bezier curves and each data described below. Those data are sent to RAM1 and RAM2 described below, as necessary.

The RAM1 is a random access memory for storing each value of the parameter function WA, WB, WC and WD in correspondence with the data table shown in FIG. 5. These date WA0 to WA128, WB0 to WB128, WC0 to WC128 and WD0 to WD128 are output from the RAM0 and are stored in the RAM1 in a manner as shown in FIG. 6. PNT1 is an address pointer for RAM1 and comprises independent address pointers PNT1A, PNT1B, PNT1C and PNT1D. PNT1A, PNT1B, PNT1C and PNT1D respectively specify each address of the data WA0 to WA128, WB0 to WB128, WC0 to WC128 and WD0 to WD128 stored in the RAM1 (see FIG. 6).

RAM2 is a random access memory for storing each coordinate data of the anchor points PA and PD and the control points PB and PC. These coordinate data are output from the RAM0 and are stored in the RAM2 in the manner shown in FIG. 7. In FIG. 7, PAx to PDx are each X coordinates of the anchor points and control points and PAy to PDy are each Y coordinates of those points. PNT2 is an address pointer for the RAM2 for specifying the address of each coordinate data of the anchor and control points stored in the RAM2 (see FIG. 7).

RAM3 is a random access memory for storing the result of hardware computations performed on the basis of expression (1), i.e., data of the X-Y coordinates (x, y) of the approximate curve. These data of X-Y coordinates (x, y) are stored in the RAM3. The data shown in FIG. 8 is shown as corresponding to the data of X-Y coordinates (x, y) shown in FIG. 1. PNT3 is an address pointer for the RAM3.

MLT is a multiplier for multiplying the data shown in FIG. 6 stored in the RAM 1 and the data shown in FIG. 7 stored in the RAM2. That is, it computes the multiplication portions (ex.. WA×PA) of expression (1). ALU is an arithmetic logical unit for adding the multiplied value of the multiplier MLT and the value of an accumulator ACC described below. ACC is the accumulator for holding the computation result of the arithmetic logical unit ALU and for outputting the computation result thereof to one input of the arithmetic logical unit ALU. That is, computation of the adding portions of expression (1) is carried out by the arithmetic logical unit ALU and the accumulator ACC.

MEM1 is a memory circuit for temporarily storing the computation result Q (x, y) of expression (1). SUB1 is a subtracter circuit for subtracting the value stored in the memory circuit MEM1 from the current computation result and for generating a substraction result therefrom. CMP1 is a comparator circuit for comparing whether an increment $\Delta x$ in the X axis direction and an increment $\Delta y$ in the Y axis direction of the subtraction result meet the condition "$\Delta x>1$ or $\Delta y>1$".

MEM2 is a memory circuit for temporarily storing pointer values of the address pointed PNT1A. SUB2 is a subtracter circuit for subtracting the pointer value stored in the memory circuit MEM2 from the current pointer value (pointer value of the address pointer PNT1A) and for generating a subtraction result therefrom.

MEM3 is a memory circuit for storing "+1" or "−1". MPX is a multiplexer for passing either the output of the subtracter circuit SUB2 or the output of the memory circuit MEM3. ADD is an adder for adding the current pointer value (the pointer value of the address pointer PNT1A) and the output value of the multiplexer MPX. CMP2 is a comparator circuit for comparing whether the pointer value of the address pointer PNT1A exceeds "128". In other words, it determines whether the value of the parameter "t" exceeds "1".

CONT is a control circuit for controlling each of the aforementioned arithmetic processing receiving commands from the microprocessor CPU0. The control circuit CONT includes microprograms for each of the arithmetic processes.

The operation of the present embodiment will now be explained using a flowchart (see FIGS. 1 to 8).

First, the following initialization is carried out on the basis of signals from the microprocessor CPU0. The data WA0 to WA128, WB0 to WB128, WC0 to WC128 and WD0 to WD128 that correspond to the parameter functions WA, WB, WC and WD are output from the RAM0 to the RAM1 and are stored in the RAM1 in a manner as shown in FIG. 6. The pointer values of the address pointer PNT1 are initialized to the addresses in the RAM1 in which the data WA64, WB64, WC64 and WD64 which correspond to "t−½(64/128)" are stored. That is, the pointer value of each address pointer PNT1A, PNT1B, PNT1C and PNT1D is respectively "64", "193", "322" and "451". Each coordinate data of the anchor points PA and PD and the control points PB and PC are output from the RAM0 to RAM2 and are stored in the RAM2 in the manner as shown in FIG. 7. The pointer value of the address pointer PNT2 is initialized to "zero". The addresses in the RAM3 "0" and "1" correspond to the coordinate (x, y) of the origin of the approximate curve and accordingly, data "0" is stored in the address "0" and data "0" is stored in address "1" of the RAM3, respectively (see FIG. 8). The pointer value of the address pointer PNT3 is initialized to "2". The coordinate (x, y) of the origin of the approximate curve, i.e., "x=0, y=0" is initialized in the memory circuit MEM1. "0" is initialized in the memory circuit MEM2 (f1).

Next, in order to find the first dot "Q1" of the approximate curve, computations corresponding to expression (1) are carried out as follows. In the multiplier MLT, the value ("WA64" see FIG. 6) stored in the address (address "64") specified by the address pointer PNT1A and the value ("PAx" see FIG. 7) stored in the address (address "0") specified by the address pointer PNT2 are multiplied. The multiplication result "WA64×PAx" is output to the Y input of the arithmetic logical unit ALU and is added to the value of the X input (the value of accumulator ACC "0"). The addition result thereof "WA64×PAx" is temporarily held in the accumulator ACC. Consecutively, the PNT1B is selected for the address pointer PNT1 and the pointer value of the address pointer PNT2 is incremented (+1). Then in the multiplier MLT, the value "WB64" see FIG. 6) stored in the address (address "193") specified by the address pointer PNT1B and the value (PBx, see FIG. 7) stored in the address (address "1") specified by the address pointer PNT2 are multiplied. The multiplication result "WAB64×PBx" is output to the Y input of the arithmetic logical unit ALU and is added to the value of the X input (the value of the accumulator "WA64×PAx"). The addition result "WA64×PAx+WB64×PBx" is temporarily held in the accumulator ACC. The result of the sum of products for the X coordinates "WA64×PAx+WB64×PBx+WC64×PCx+WD64×PDx" may be obtained by the same operation as described above and the result of the sum of the products is rounded up by the arithmetic logical unit ALU. Similarly, the result of the sum of the products for Y coordinates "WA64×PAy+WB64×PBy+WC64×PCy+WD64×PDy" may be obtained and the result of the sum of the products is rounded up by the arithmetic logical unit ALU (f2, f3).

In the subtracter circuit SUB1, the value of the X-Y coordinate Q0 of the origin (0, 0) of the approximate curve stored in the memory circuit MEM1 is subtracted from the value (x, y) of the X-Y coordinate after being rounded up. An increment Δx in the X axis direction and an increment Δy in the Y axis direction of the subtraction result are output to the comparator circuit CMP1 and are compared whether they meet the condition "Δx>1 or Δy>1" (f4).

When the subtraction result is "Δx>1 or Δy>1", in order to read out data WA32, WB32, WC32 and WD32 which correspond to "t=t/2" i.e., "t=⅕ (32/128)", the pointer value of each address pointer PNT1A, PNT1B, PNT1C and PNT1D is set in the address value of the RAM1 in which those data are stored (f5).

The above operations f2 to f4 are repeated until the subtraction result does not meet the condition "Δx>1 or Δy>1". That is, the above operations f2 to f4 are repeated until the subtraction result satisfies the relationships:

$$(\Delta x=0 \text{ and } \Delta y=1) \text{ or } (\Delta x=1 \text{ and } \Delta y=0) \text{ or } (\Delta x=1 \text{ and } \Delta y=1) \quad (3)$$

The values (x, y) of the X-Y coordinate when the conditions of expression (3) are met are the coordinates of the first dot Q1 (x, y) of the approximate curve ("x=0, y=1" in the case of FIGS. 1 and 2). The values of this coordinate Q1 (x, y) are stored at the address ("0002", "0003", see FIG. 8) of the RAM3 specified by the address pointer PNT3. Moreover, the values of this coordinate Q1 (0, 1) are stored in the memory circuit MEM1 instead of the coordinate of the origin Q0 (0, 0) of the approximate curve (f6).

Then the routine for finding the second dot "Q2" and thereafter "Q3", ... of the approximate curve is carried out as follows. SUB2 subtracts the value "0" stored in the memory circuit MEM2 from the pointer value (value of "n" "2" in FIG. 1) of the address pointer PNT1A and outputs the value of Δn shown in FIG. 1 ("Δn=2" in the case of FIGS. 1 and 2). Then the value of the address pointer PNT1A ("2" in the case of FIGS. 1 and 2) is stored in the memory circuit MEM2 (f7).

The adder circuit ADD adds each pointer value of the address pointers PNT1A, PNT1B, PNT1C and PNAT1D and value of Δn respectively and the result thereof becomes a new pointer value of each address pointer PNT1A, PNT1B, PNT1C and PNT1D (f8). Then the sum of products computation and rounding up are carried out in the same manner as in (f2) and (f3) (f9, f10).

The subtracter circuit SUB1 subtracts the value of the X-Y coordinate Q1 (x, y) stored in the memory circuit MEM1 ("x=0, y=1" in the case of FIGS. 1 and 2) from the value of the X-Y coordinate after being rounded up ("x=1, y=2" in the case of FIGS. 1 and 2). The subtraction results Δx and Δy are output to the comparator circuit CMP1. In the case of "Δx>1 or Δy>1", the adder circuit ADD adds each pointer value of the address pointer PNT1A, PNT1B, PNT1C and PNT1D and the value "−1" stored in the memory circuit MEM3. As a result, each pointer value of the address pointer PNT1A, PNT1B, PNT1C and PNT1D is decremented by −1 (f11, f12) If "Δx=0 and Δy=0", the adder circuit ADD adds each pointer value of the address pointer PNT1A, PNT1B, PNT1C and PNT1D and the value "+1" stored in the memory circuit MEM3. As a result, each pointer value of the address pointer PNT1A, PNT1B, PNT1C and PNT1D is incremented by +1 (f13, f14). Since the subtraction results meet neither of the conditions in f11 and f13 in the case of FIGS. 1 and 2, values of the X-Y coordinate x=1, y=2 after the sum of products computation and rounding up become the coordinate of the second dot "Q2" as it is (f15).

The subtracter circuit SUB2 subtracts the value "2" stored in the memory circuit MEM2 from the pointer value of the address pointer PNT1A ("4" in the case of FIGS. 1 and 2) and outputs the value of Δn ("Δn=2" in the case of FIGS. 1 and 2) (f17).

The adder circuit ADD adds each pointer value of the address pointer PNT1A, PNT1B, PNT1C and PNT1D and the value of Δn, respectively, and the addition result thereof becomes a new pointer value of each of the address pointer PNT1A, PNT1B, PNT1C and PNT1D (f18).

Hereinafter, the routine from f9 to f18 is repeated in the same manner as described above until the value of n exceeds "128", i.e., when the condition "0≦t≦1" is met (f16). Thus dots (Qm (x, y) of the approximate curve are sequentially determined and their values are stored sequentially in the RAM3 as shown in FIG. 8. In the example of FIGS. 1 and 2, the case of finding the 20th dot Q20 corresponds to the routine of f12 and the case of finding the 17th dot Q17 corresponds to the routine of f14.

As described above, the coordinates of the intersections of X-Y matrix in the approximate curve are sequentially found.

Figure 9:
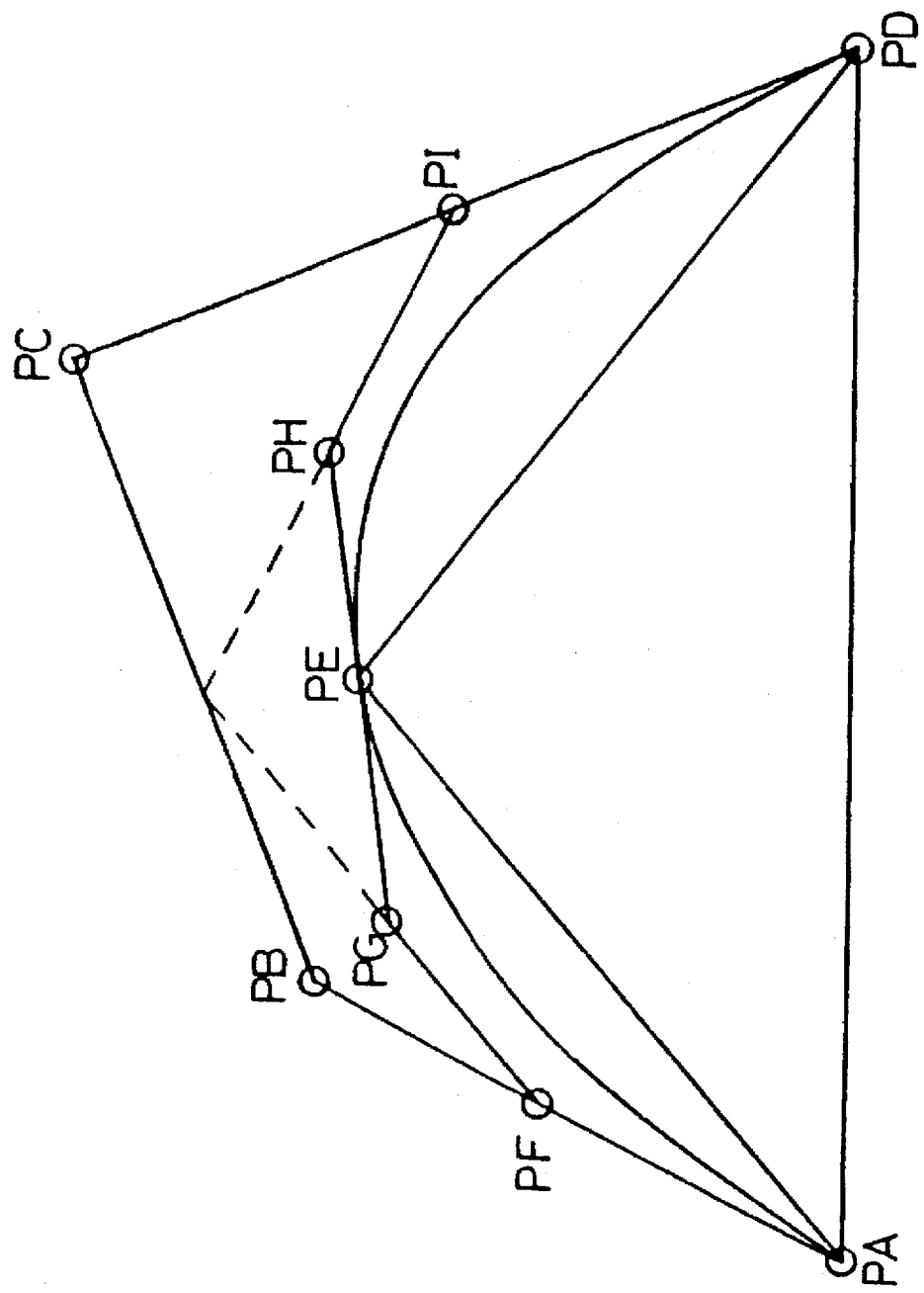
FIG. 9 is a diagram for explaining when a part of the embodiment is changed.

In the embodiment described above, when "t<1/128" results after performing the routine of f5, i.e., when "n<1" results, the following processing may be carried out using "½ sub-span method" (see FIG. 9). At first, an original curve is divided into two segments and new anchor and control points are determined on each of the segments. In the example in FIG. 9, the anchor points of one segment are PA and PE and the control points thereof are PF and PG, and the anchor points of the other segment are PE and PD and control points thereof are PH and PI. Similar processing as described above is carried out on each segment using those new anchor and control points. Then the processing results of each segment are finally combined to determine coordinates of intersections of X-Y matrix in the approximate curve.

Although "t" is split into 128 sections to structure the data table, the data table may be structured by increasing the number of splits to 256, 512, ... when large coordinate data is to be processed. When small coordinate data is to be processed using a data table with a greater number of splits, a quick convergence to a value that meets a predetermined condition and fast processing become possible if a larger value than "±1" ("±3 for example) is stored in the memory circuit MEM3 shown in FIG. 3.

The concept of the present invention is applicable not only to two-dimensional curves as described above, but also to three-dimensional curves.

The use of the curve approximation method of the present invention allows curve approximation with shorter processing time and a better approximation accuracy.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What we claim is:

1. A method for producing an outline font by expressing an approximate curve of an original curve Q of an outline font represented by points "Pk" (k=1, ..., m) which represent anchor points and control points used for determining the shape of the original curve and by parameter functions "Wk" (k=1, ..., m) expressed by using a parameter "t" used for determining the type of original curve, as follows:

$$Q = \sum_{k=1}^{k=m} (Wk \times Pk)$$

in which the approximate curve is approximately expressed by dots in a matrix of a display medium, said method comprising the steps of:
  using a program stored in a read only memory to form said approximate curve according to the following steps:
    finding a coordinate of first and second dots of three consecutive dots on the approximate curve and on said matrix;
    then finding a coordinate of a third dot of the three consecutive dots on the approximate curve and on said matrix on the basis of a difference between the value of said parameter "t" used for determining said coordinate of the first dot and that used for determining said coordinate of the second dot;
    sequentially finding coordinates of consecutive additional dots on the approximate curve and on said matrix on the basis of a difference between the value of said parameter "t" used for determining a coordinate of a previous dot and that used for determining a coordinate of a next previous dot; and
    forming said approximate curve representative of said outline font by said found coordinates of said dots; and
  displaying said approximate curve on said dots in the matrix of the display medium.

2. A method for producing an outline font by expressing an approximate curve of an original curve Q of an outline font represented by points "Pk" (k=1, ..., m) which represent anchor points and control points used for determining the shape of the original curve and by parameter functions "Wk" (k=1, ..., m) expressed by using a parameter "t" used for determining the type of original curve, as follows:

$$Q = \sum_{k=1}^{k=m} (Wk \times Pk)$$

in which the approximate curve is approximately expressed by dots in a matrix of a display medium, said method comprising the steps of:
  using a program stored in a read only memory to form said approximate curve according to the following steps:
    splitting a variation range of said parameter "t" into a plurality of sections and defining a parameter value of said parameter "t" for each split point;
    first finding a coordinate of a first dot of three consecutive dots on the approximate curve and on said matrix and a first parameter value used for determining said coordinate of said first dot;

second finding a coordinate of a second dot of the three consecutive dots on the approximate curve and on said matrix and a second parameter value used for determining said second coordinate of said second dot;

third finding a coordinate of a third dot of the three consecutive dots on the approximate curve and on said matrix on the basis of a third parameter value determined by a difference between said first parameter value and said second parameter value;

sequentially finding coordinates of consecutive additional dots on the approximate curve and on said matrix on the basis of an additional parameter value determined by a difference between the parameter value associated with coordinates of a previous dot and the parameter value associated with coordinates of a next previous dot; and forming said approximate curve representative of said outline font from said found coordinates of said dots; and displaying said approximate curve on said dots in the matrix of the display medium.

3. A method for producing an outline font by expressing an approximate curve of an original curve Q of an outline font represented by points "Pk" (k=1, . . . , m) which represent anchor points and control points used for determining the shape of the original curve and by parameter functions "Wk" (k=1, . . . , m) expressed by using a parameter "t" used for determining the type of original curve, as follows:

$$Q = \sum_{k=1}^{k=m} (Wk \times Pk)$$

in which the approximate curve is approximately expressed by dots in a matrix of a display medium, said method comprising the steps of:

using a program stored in a read only memory to form said approximate curve according to the following steps:

a first step of finding a coordinate of a first dot on said approximate curve and on said matrix by using said parameter "t";

a second step of finding a coordinate on the original curve by changing the value of the parameter "t" used in the first step;

a third step of finding a coordinate of a dot on said matrix which is nearest to the coordinate on the original curve found in the second step;

a fourth step of determining the coordinate of the dot found in the third step as a second dot on the approximate curve and on said matrix that immediately follows the first dot when an interval between the coordinate of the first dot found in the first step and the coordinate of the dot found in the third step is separated by one dot at least in one axial direction and is not separated by more than 1 dot in any axial direction;

substituting said second dot in said third step for said first dot in said first step and repeating the first through fourth steps to determine the coordinates of additional dots on the approximate curve and on said matrix; and forming said approximate curve representative of said outline font from said determined coordinates of said dots; and displaying said approximate curve on said dots in the matrix of the display medium.

4. A method for producing an outline font by expressing an approximate curve of an original curve Q of an outline font represented by points "Pk" (k=1, . . . , m) which represent anchor points and control points used for determining the shape of the original curve and by parameter functions "Wk" (k=1, . . . , m) expressed by using a parameter "t" used for determining the type of original curve, as follows:

$$Q = \sum_{k=1}^{k=m} (Wk \times Pk)$$

in which the approximate curve is approximately expressed by dots in a matrix of a display medium, said method comprising the steps of:

using a program stored in a read only memory to form said approximate curve according to the following steps:

splitting a variation range of said parameter "t" into a plurality of sections and defining a parameter value of said parameter "t" for each split point;

a first step for finding a coordinate of a first dot on said approximate curve and on said matrix by using said parameter value;

a second step for finding a coordinate on the original curve by using a parameter value other than that used in the first step;

a third step for finding a coordinate of a dot of said matrix which is nearest to the coordinate on the original curve found in the second step;

a fourth step of determining the coordinate of the dot found in the third step as a second dot on the approximate curve and on said matrix that immediately follows the first dot when an interval between the coordinate of the first dot found in the first step and the coordinate of the dot found in the third step is separated by one dot at least in one axial direction and is not separated by more than 1 dot in any axial direction;

substituting said second dot in said third step for said first dot in said first step and repeating the first through fourth steps to determine the coordinates of additional dots on the approximate curve; and forming said approximate curve representative of said outline font from said determined coordinates of said dots; and displaying said approximate curve on said dots in the matrix of the display medium.

5. A method for producing an outline font by expressing an approximate curve of an original curve Q of an outline font represented by points "Pk" (k=1, . . . , m) which represent anchor points and control points used for determining the shape of the original curve and by parameter functions "Wk" (K=1, . . . , m) expressed by using a parameter "t" used for determining the type of original curve, as follows:

$$Q = \sum_{k=1}^{k=m} (Wk \times Pk)$$

in which the approximate curve is approximately expressed by dots in a matrix of a display medium, said method comprising the steps of:

using a program stored in a read only memory to form said approximate curve according to the following steps:

a first step for finding an XY coordinate of a first dot on said approximate curve and on said matrix by using said parameter "t";

a second step for finding an XY coordinate on the original curve by changing the value of the parameter "t" used in the first step;

a third step for finding an XY coordinate of a dot on said matrix which is nearest to the XY coordinate on the original curve found in the second step;

a fourth step for determining the XY coordinate of the dot found in the third step as a second dot on the approximate curve and on said matrix that immediately follows the first dot when an interval between the XY coordinate of the first dot found in the first step and the XY coordinate of the dot found in the third step is separated by one of the following:

a) zero dot in the X axis direction and one dot in the Y axis direction, b) one dot in the X axis direction and zero dot in the Y axis direction, and c) one dot in the X axis direction and one dot in the Y axis direction;

substituting said second dot in said third step for said first dot in said first step and repeating the first through fourth steps to determine the coordinates of additional dots on the approximate curve and on said matrix; and forming said approximate curve representative of said outline font from said determined coordinates of said dots; and displaying said approximate curve on said dots in the matrix of the display medium.

6. A method for producing an outline font by expressing an approximate curve of an original curve Q of an outline font represented by points "Pk" (k=1, . . . , m) which represent anchor points and control points used for determining the shape of the original curve and by parameter functions "Wk" (K=1, . . . , m) expressed by using a parameter "t" used for determining the type of original curve, as follows:

$$Q = \sum_{k=1}^{k=m} (Wk \times Pk)$$

in which the approximate curve is approximately expressed by dots in a matrix of a display medium, said method comprising the steps of:

using a program stored in a read only memory to form said approximate curve according to the following steps:

splitting a variation range of said parameter "t" into a plurality of sections and defining a parameter value of said parameter "t" for each split point;

a first step for finding an XY coordinate of a first dot on said approximate curve and on said matrix by using said parameter value;

a second step for finding an XY coordinate on the original curve by using a parameter value other than that-used in the first step;

a third step for finding an XY coordinate of a dot on said matrix which is nearest to the XY coordinate on the original curve found in the second step;

a fourth step for determining the XY coordinate of the dot found in the third step as a second dot on the approximate curve and on said matrix that immediately follows the first dot when an interval between the XY coordinate of the first dot found in the first step and the XY coordinate of the dot found in the third step is separated by one of the following:

a) zero dot in the X axis direction and one dot in the Y axis direction, b) one dot in the X axis direction and zero dot in the Y axis direction, and c) one dot in the X axis direction and one dot in the Y axis direction;

substituting said second dot in said third step for said first dot in said first step and repeating the first through fourth steps to determine the coordinates of additional dots on the approximate curve and on said matrix; and forming said approximate curve representative of said outline font from said determined coordinates of said dots; and displaying said approximate curve on said dots in the matrix of the display medium.

* * * * *